United States Patent [19]
Piret

[11] 3,800,628
[45] Apr. 2, 1974

[54] HYDRAULIC SYSTEM FOR CONTROLLING A GEARBOX

[75] Inventor: Jean Piret, Bougival, France

[73] Assignees: Automobiles Peugot, Paris; Regie Nationale Des Usines Renault, Boulogne-Billancourt, both of, France

[22] Filed: Aug. 14, 1972

[21] Appl. No.: 280,103

[30] Foreign Application Priority Data
Sept. 28, 1971 France .............................. 71.34770

[52] U.S. Cl. ................................ 74/864, 74/752 C
[51] Int. Cl. ........................ B60k 21/00, F16h 3/74
[58] Field of Search ................... 74/863, 864, 752 C

[56] References Cited
UNITED STATES PATENTS

| | | | |
|---|---|---|---|
| 3,023,632 | 3/1962 | Flinn | 74/864 |
| 3,158,037 | 11/1964 | Searles | 74/864 |
| 3,287,995 | 11/1966 | Leonard et al. | 74/864 X |

*Primary Examiner*—Arthur T. McKeon
*Attorney, Agent, or Firm*—Burns, Doane, Swecker & Mathis

[57] ABSTRACT

This improved system for automatically varying, as a function of the conditions of operation of the engine (torque and running speed), the duration of the transitory stage when changing under torque from one gear ratio to the immediately lower gear ratio in an automatically controlled gearbox. For this purpose, there is exerted on the slide valve of the main relay valve a force which varies in accordance with said conditions, for example by employing a modulating valve which establishes a modulated pressure in a pipe.

11 Claims, 4 Drawing Figures

HYDRAULIC SYSTEM FOR CONTROLLING A GEARBOX

The present invention relates to hydraulic systems for controlling automatic gearboxes in particular intended for automobile vehicles.

It is known that these automatic gearboxes comprise at least one planetary gear means for establishing between an input shaft and an output shaft a transmission ratio which is determined in accordance with various parameters, such as the load or the torque of the engine and the speed of the vehicle. The establishment of the suitable ratio is ensured by means of brake and clutch devices the selective actuation of which is achieved by the hydraulic control system to which the present invention relates. An example of such a system is described in the U.S. Pat. application Ser. No. 266,577 filed by the Applicants on July 27, 1972. In a general way, in conventional control systems, changing from one given ratio to the immediately higher ratio is effected by actuating a brake or clutch device and releasing another of these brake and clutch devices, the release of the second device occurring only at the moment when, or immediately after, the first device is actuated so as to avoid overrevving and a racing of the engine. Similarly, changing under torque from the upper ratio to the immediately lower ratio is achieved by releasing the second clutch or brake device followed by actuation of the first of said devices, a transitory period existing, however, between the two operations so as to enable the engine to increase in speed and adapt itself to the new ratio. In view of the fact that such a ratio change under torque from one ratio to the immediately lower ratio, for example changing from third to second speed in the case of an automatic gearbox having three ratios or speeds, may be effected under conditions of utilisation which are very different as concerns the load or the torque and the speed, if the system is arranged for achieving a correct change for certain conditions of operation it will be understood that this adjustment will be unsuitable when the conditions are modified. Now, during the transitory stage between cutting off the supply to the clutch or brake device corresponding to the upper ratio and supplying the fluid to the clutch or brake device which corresponds to the lower ratio, there is practically no load on the engine so that the speed increases and at the moment of actuating the clutch or brake device corresponding to the lower ratio, this speed may be too low or too high relative to the optimum value corresponding to this lower ratio in the temporary conditions of load (or torque) and speed and this results in an unpleasant and defective operation and, as the case may be, an overrevving or a shock due to deceleration.

An object of the present invention is to overcome this drawback and to provide a hydraulic control system for a gearbox which permits automatically adapting the duration of the transitory period between the cutting off pertaining to upper ratio and the engagement of the immediately lower ratio under torque to the values of the various parameters of operation of the engine, such as the load (or torque) and the running speed.

The invention provides a hydraulic control system for an automatic gearbox comprising a tank, a pump and a pressure regulating valve, and a circuit comprising: a manually controlled selector valve; a change gear valve supplying fluid selectively, depending on its position, to one or the other of two clutch or brake devices respectively corresponding to the engagement of two successive ratios; a main relay valve interposed between the change gear valve and a first clutch or brake device which corresponds to the engagement of the higher of said two ratios, said relay valve comprising a slide member subjected on one face to the fluid supply pressure of the other of said devices so that the supply of fluid to the first device is cut off when the other is supplied with fluid and inversely, said hydraulic system comprising: means for applying to the slide member of the main relay valve a force due to at least one fluid pressure the value of which is a function of the load or torque and the running speed of the engine, whereby, when changing under torque from the high ratio to the immediately lower ratio, the time for displacing the slide member from the moment when the other device is no longer supplied with fluid, is determined by the value of said force.

In view of the fact that it is shifting of the slide member of the main relay valve that causes fluid to be supplied to the clutch or brake device corresponding to the lower ratio, it can be seen that the desired result is obtained and that owing to such an arrangement, the duration of the transitory period is determined in accordance with the temporary conditions of load (or torque) and running speed of the engine.

According to a first embodiment of the invention, the system comprises a modulating valve which is supplied with fluid at the line pressure of the circuit and furnishes to the main relay valve a modulated control pressure, and modulating valve comprising a slide member which is subjected on one face to a first control pressure which varies in accordance with the running speed of the engine and on its other face to a second control pressure which varies in accordance with the load or torque of the engine.

According to a second embodiment of the invention which is particularly advantageous, the main relay valve is adapted in such manner that said control pressures, which vary in accordance with the engine speed and load, are directly applied to the slide member of the main relay valve so that the presence of an additional modulating valve is unnecessary.

In both cases, when the invention is applied to a hydraulic system such as that described in the aforementioned U.S. patent application, in which the line pressure in the system is a function of the transmission ratio established in the gearbox, the pressure regulating valve can be so adapted that the line pressure for the first speed, which is also the line pressure when changing under torque from the third to the second speed for example, varies as a function of the running speed of the engine, this line pressure then constituting one of said control pressures which acts directly or indirectly on the main relay valve. Also, in both cases, the pressure furnished by the pilot valve can be employed as a second control pressure, since the pilot pressure varies as a function of the depression in the induction pipe of the engine and consequently as a function of the engine load or torque.

Further features and advantages of the invention will be apparent from the ensuing description with reference to the accompanying drawings.

Figure 1:
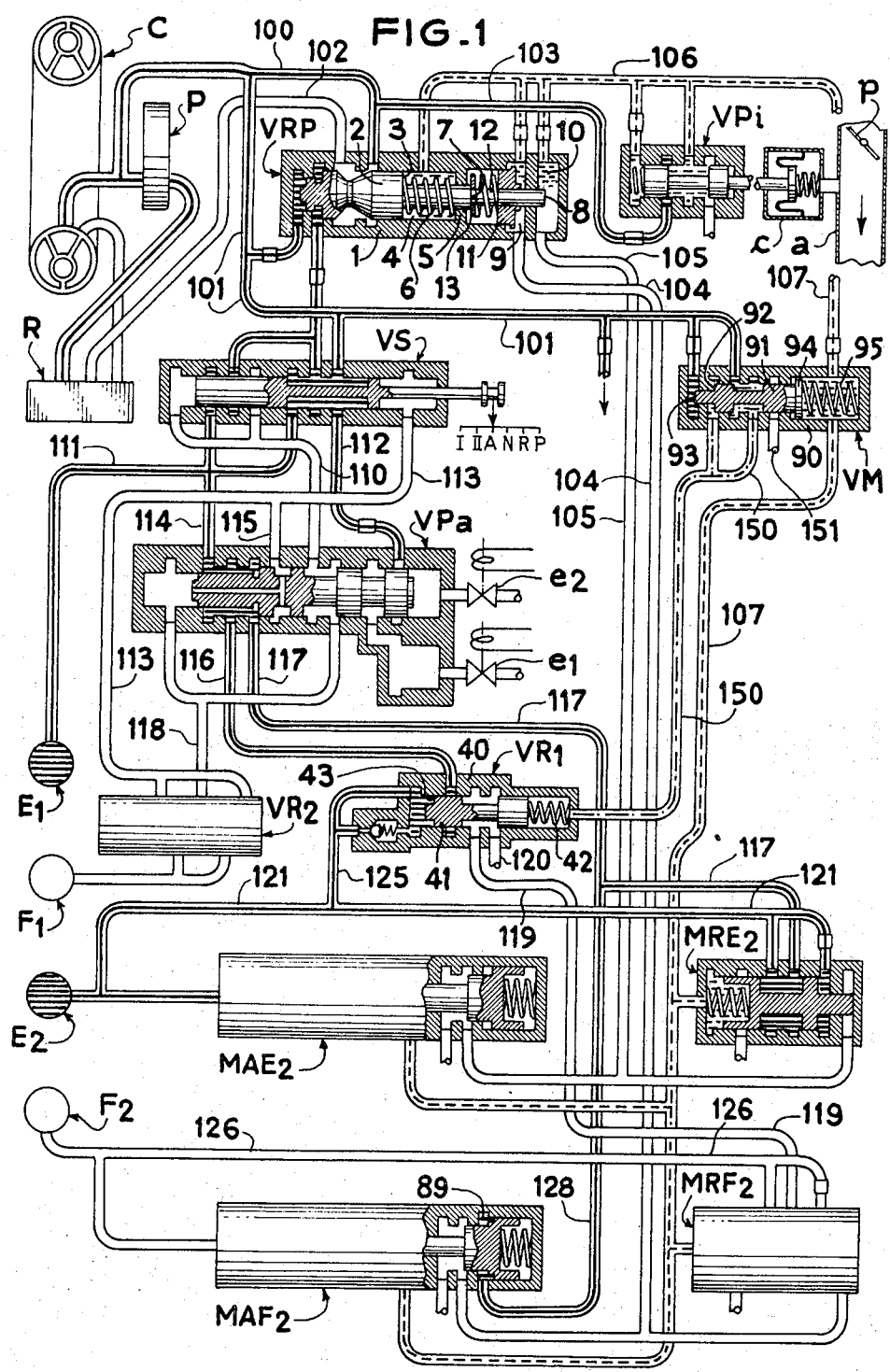
FIGS. 1 and 2 are diagrams of a first embodiment of a control system according to the invention in two different states selected to show the improvements afforded by the invention.
Figure 2:
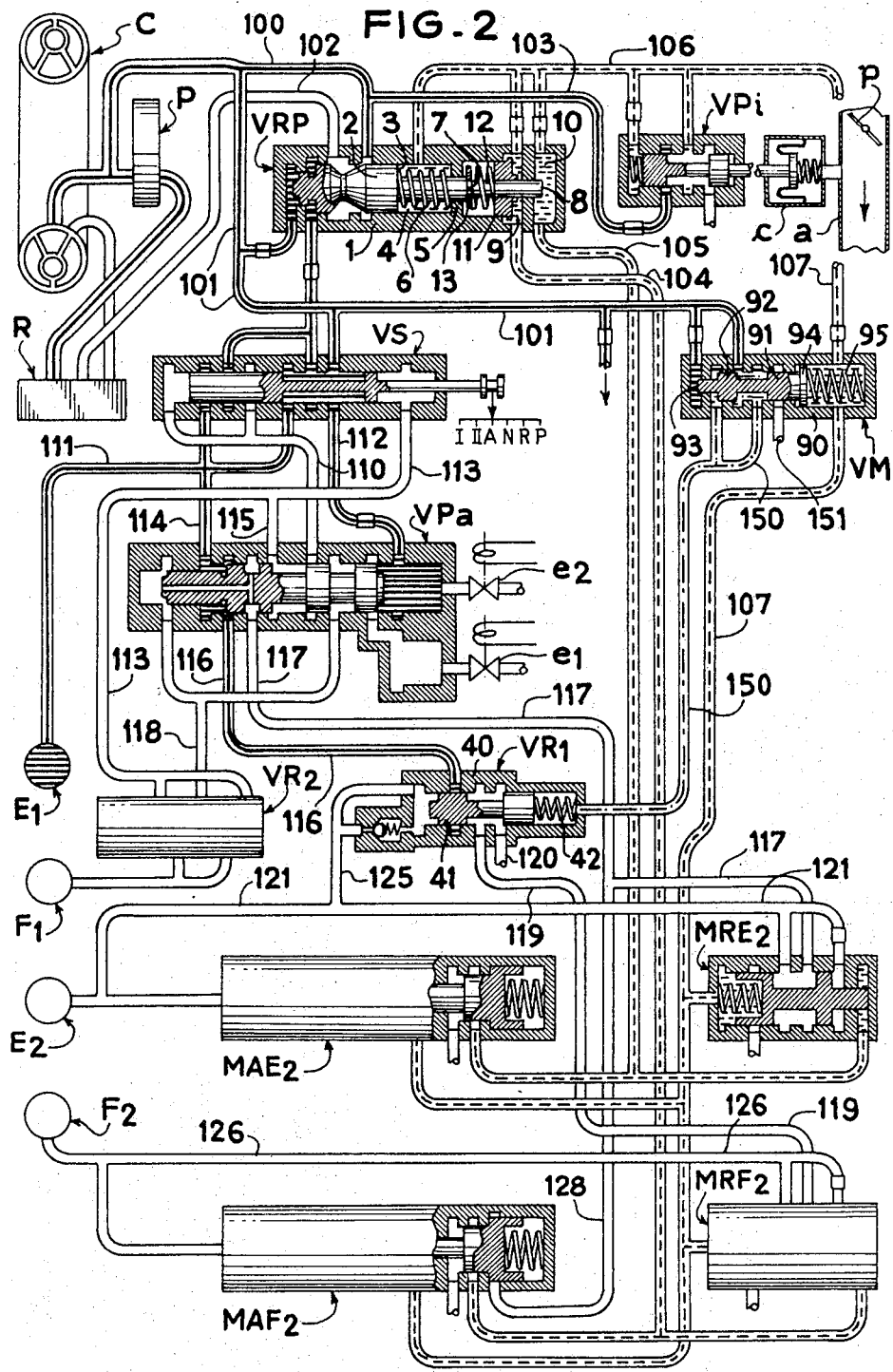

Reference will be made first to FIGS. 1 and 2 to describe a first embodiment of a hydraulic control system according to the invention, it being understood that only the parts of the system which are indispensible to a proper understanding of the invention will be described and that the same reference numbers or letters designate the corresponding elements in FIGS. 3 and 4. The main components of this system are:

a displacement pump P which is driven by the engine of the vehicle and whose output or flow at the outlet is consequently proportional to the engine speed and which supplies fluid from a tank R to the whole of the system and to the torque converter C;

a pressure regulating valve VRP which determines the value of the line pressure in the system;

a pilot valve VPi which is controlled as a function of the load on the engine, for example by a capsule $c$ connected to the induction pipe $a$ on the downstream side of the fuel regulating throttle $p$, and which supplies a pilot pressure transmitted to the pressure regulating valve;

a manually controlled selector valve VS whose slide member can be placed in any one of six positions which respectively correspond to the first imposed speed (I), the second imposed speed (II), automatic operation for forward speeds (A), the neutral position (N), reverse speed (R) and parking (P);

a change gear valve VPa whose slide member can occupy three positions as a function of two parameters, namely: the speed of the vehicle and the opening of the carburetter; these parameters are measured in the known manner by a tachymetric alternator which is driven by the output shaft of the gearbox; the tachymetric alternator comprises a moving pole whose angular position corresponds to the angle of the fuel throttle so that the output voltage of the alternator is a function of the speed of the vehicle and of the driving torque. This voltage is treated by an electronic unit of known type which acts on two electrically operated pilot valves $e1$ and $e2$;

two relay valves, namely a main relay valve VR1 and a secondary relay valve VR2. The important part played by the main relay valve in the circuit will be explained hereinafter;

two units respectively associated with a clutch fluid pressure actuated device such as a E2 and a fluid pressure actuated device such as a brake F2, each unit comprising two subassemblies MAE2 and MRE2, and MAF2 and MRF2 the main function of which is to rapidly fill the associated clutch E2 or brake F2, to modulate the pressure for actuating this clutch and this brake as a function of the driving torque, and to furnish to the regulating valve VRP an information which permits adapting the value of the line pressure as a function of the ratio established in the gearbox;

a modulating valve VM adapted to furnish to the main relay valve VR1 a control pressure or modulated pressure, as will be more clearly understood hereinafter.

There will now be described in more detail the essential parts of the system according to the invention, namely the pressure regulating valve, the main relay valve and the modulating valve, and the various hydraulic connections to permit explaining the operation of the whole of the system.

The regulating valve VRP comprises a body 1 in which is received a slide member 2, the axial position of the latter determining the value of the free section between a pipe 100 which branches off the delivery pipe 101 of the pump and a pipe 102 for connection to the exhaust of the circuit; namely the tank R, the value of this free section determining, bearing in mind the output flow of the pump and the flow employed, the value of the line pressure. The slide member 2 is subjected at its left end to the line pressure constituting the value to be regulated and subjected on a radial shoulder 3 to the pilot pressure delivered by the valve VPi in a chamber 4. Between the shoulder 3 of the slide member and a radial bearing face 5 formed in the body 1 there is disposed a relatively weak rating or calibrating spring 6. The slide member 2 has a stepped extension portion defining two radial faces 7, 8 which are respectively subjected to the pressures prevailing in two separate chambers 9 and 10 formed in the body of the valve. The pressure prevailing in the chamber 9 is exerted through a piston 11 through which extends the extension of the slide member 2 and a relatively stiff spring 12 interposed between this piston and a support flange or collar 13 carried by the slide member. The pressure prevailing in the second chamber 10 is exerted directly on the end face 8 of the slide member. The two chambers 9 and 10 are connected to a pipe 106 in which prevails the pilot pressure. They are, moreover, connected through two other pipes 104 and 105 to the units MAE2 and MAF2 as described in the aforementioned U.S. patent application.

The pilot valve VPi, supplied at 103 with fluid at the line pressure, has its slide member connected to the movable wall of a capsule $c$ in which prevails the pressure in the induction pipe $a$ of the engine on the downstream side of the fuel throttle $p$. It will be unnecessary to go into the details of the construction of this valve or of the selecting valve and change gear valve; it suffices to note that there extend from this selecting valve pipes 110, 111, 112, 113 of which 110, 112 are connected to the change gear valve VPa, 111 to the clutch E1 and 113 to the secondary relay valve VR2. Likewise, the change gear valve is connected through inlet pipes 110, 112, 114, 115 to the selector valve VS. Extending from this change gear valve are outlet pipes 116, 117, 118 respectively connected to the relay valve VR1, the clutch E2 through the unit MRE2, and the relay valve VR2.

The main relay valve VR1 comprises a fluid inlet 116 and two outlets 119, 120 leading respectively to the unit MRF2 and the tank, and the position of its slide member 41 in the body 40 is controlled by the pressure prevailing in a pipe 125 extending from the supply pipe 121 of the clutch E2 and by a modulated pressure which is transmitted via a pipe 150 and furnished by the modulating valve VM and acts in the same direction as a weak spring 42.

The modulating valve VM comprises a body 90 in which a slide member 91 is slidably mounted. This slide member comprises two bearing faces and defines the section of the passage between an inlet pipe 101 in which the line pressure prevails and an outlet pipe 150 in which the modulated pressure prevails. The modulated pressure is transmitted to a shoulder 92 of the slide member and a pipe 151 is connected to the tank. The two control pressures acting on the opposite ends 93, 94 of the slide member are respectively the line pressure which acts on the left end 93 of the slide member and the pilot pressure which is transmitted by a pipe 107 and acts, together with a calibrated spring 95, on the right end 94 of this slide member.

Operation of the first embodiment of the invention will now be described:

The pipes in which the line pressure prevails contain a full line whereas the pipes in which the pilot pressure prevails contain a dotted line, the modulated pressure being represented by a dot-dash line. In the third speed position (FIG. 1), the clutches E1 and E2 are actuated so that the actuating pressure of E2 is applied to the slide member of the main relay valve and maintains the latter in the position shown in FIG. 1, that is, on the right, in which position the supply of fluid to the brake F2 by way of the unit MRF2 is cut off. In respect of this ratio the two chambers 9 and 10 of the pressure regulating valve are connected to the tank by way of the pipes 104, 105 in the modulators MAE2 and MAF2 so that the slide member 2 tends to move toward the right and the line pressure is established at a relatively low value. When the pilot valve e2 is closed, the slide member of the gear ratio changing valve VPa moves to the left and this cuts off the supply of fluid to the clutch E2 by way of the pipe 117 and the sub-assembly MRE2 and cuts off the maintaining pressure which was applied by way of the pipe 128 in the chamber 89 of the modulator MAF2. Consequently, the slide members of the two modulators MAE2 and MAF2 move to the left and thus close the pipes 104 and 105 and put the two chambers 9 and 10 of the pressure regulating valve under pressure and thus establish in the circuit a line pressure which corresponds to the line pressure of the first speed and has a value substantially higher than the line pressure of the second and third speeds.

Cutting off the supply of fluid to the clutch E2 suppresses the force of pressure which was exerted on the left end of the slide member 41 of the main relay valve so that this slide member tends to move to the left under the effect of the spring 42 and the modulated pressure. It will be understood that the value of this modulated pressure determines the duration of the displacement to the left of this slide member and consequently the period of time at the end of which the brake F2 is applied, through the pipe 119, the unit MRF2 and the pipe 126. Now, this modulated pressure is itself determined by the position of the slide member 91 of the modulating valve which itself depends on the values of two control pressures, namely the line pressure and the pilot pressure, which are exerted respectively on the left face and on the right face of the slide member 91. It will be clear that the pilot pressure varies as a function of the depression which prevails in the induction pipe, this pilot pressure increasing with increase in the opening of the fuel throttle and increase in the torque and load. Further, as the chamber 9 of the pressure regulating valve is under pressure, the piston 11 is maintained in its left position and constitutes a practically fixed support face for the spring 12. Bearing in mind that this spring is relatively stiff, it introduces a static condition of regulation the main result of which is to vary the value of the line pressure as a function of the running speed of the engine, the line pressure becoming in this case an increasing linear function of the speed. Thus it is clear that the modulated pressure is in fact determined as a function of two parameters of operation of the engine, namely the running speed and the torque or load.

Note that the static condition of regulation introduced in the pressure regulating valve only intervenes when the line pressure is that corresponding to the first speed, it being understood that for the two other ratios, namely second and third speeds, the chamber 9 is not subjected to pressure so that the piston 11 is free to move and does not hinder the movement of the slide member 2.

Figure 3:
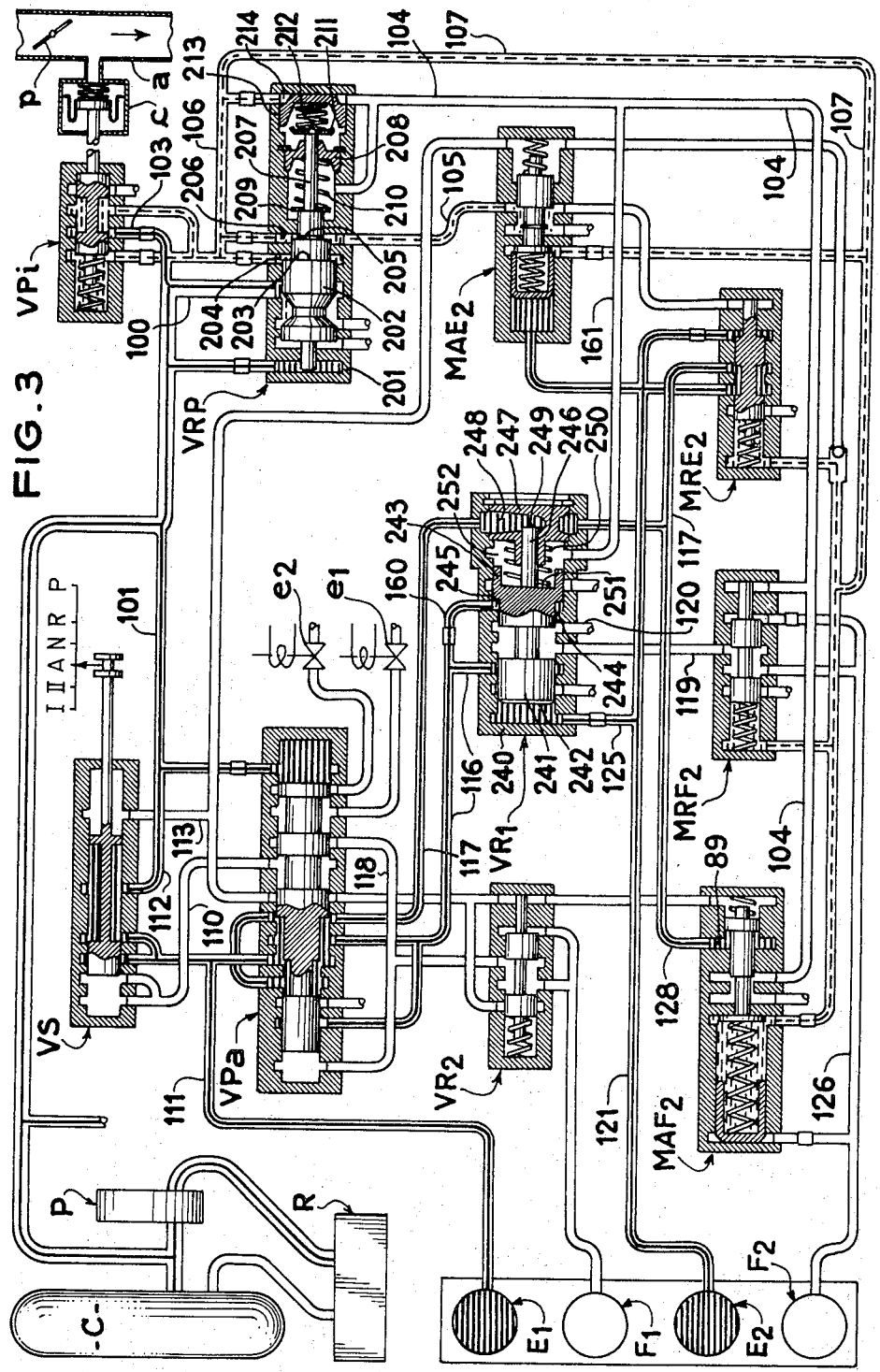
FIGS. 3 and 4 are two diagrammatic views of a second embodiment of such a system also in two different states.
Figure 4:
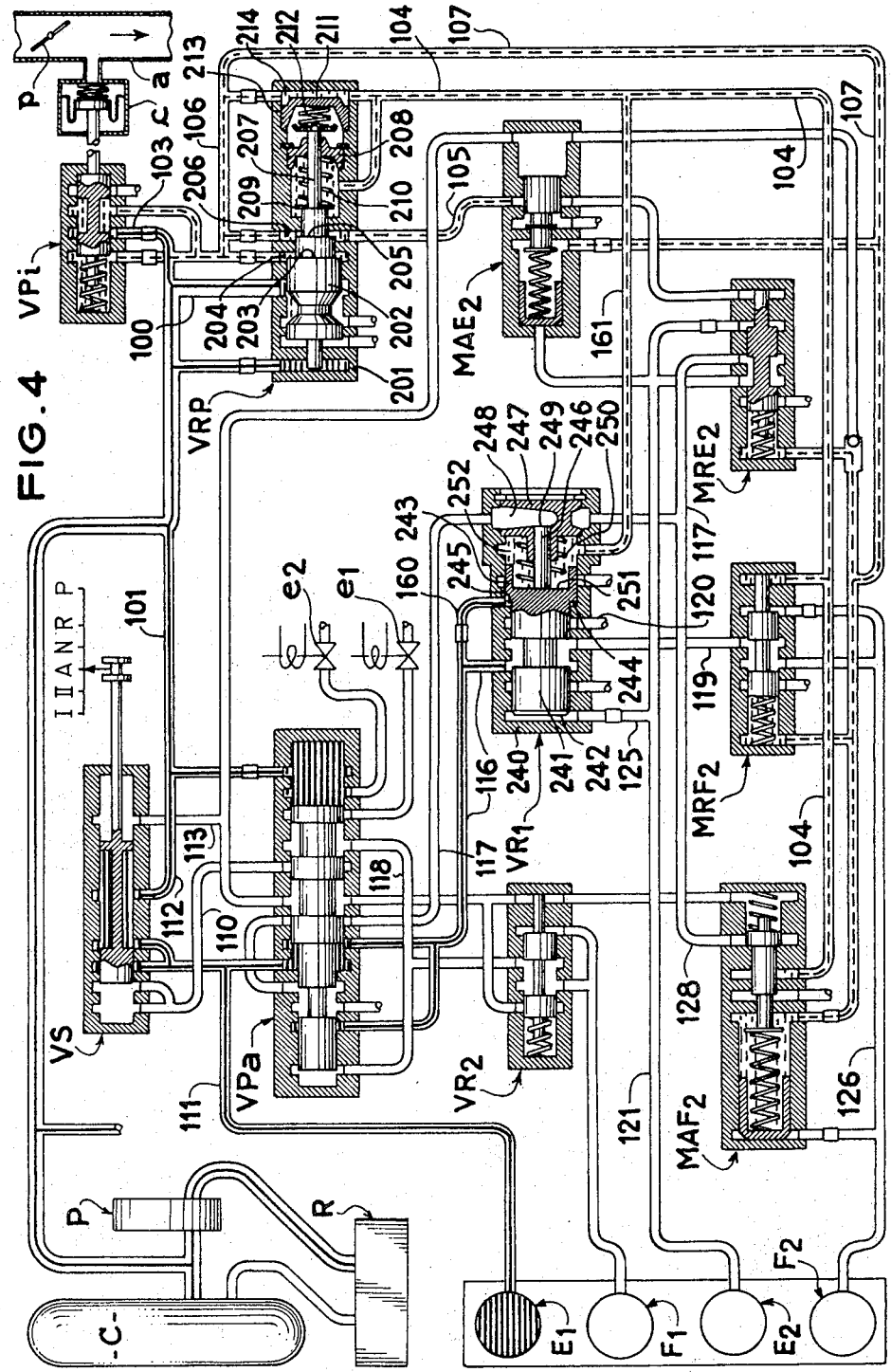

The modifications in the embodiment shown in FIGS. 3 and 4 concern essentially the construction of the pressure regulating valve which, however, continues to perform the same function as in the embodiment shown in FIGS. 1 and 2, and the omission of the modulating valve which results in a different construction of the main relay valve VR1.

In the pressure regulating valve VRP which has a body 201, the position of the slide member 202 determines the free section between the pipe 100 and the tank R and consequently, bearing in mind the output flow of the pump and the flow employed, the value of the line pressure prevailing in the pipe 101 and in the remainder of the circuit. This slide member is subjected on its left end to the line pressure and on a first radial shoulder 203 to the pilot pressure transmitted from the pilot valve VPi to a chamber 204 by way of the pipe 106. A second radial shoulder 205 of the slide member is subjected to the pressure prevailing in a chamber 206 connected to a pipe 106 and to the pipe 105 which is closed or connected to the exhaust tank, depending on the position of the slide member of the accumulator MAE2, the position of this slide member being itself determined by the fact that the associated clutch E2 is supplied with fluid or not supplied with fluid. The slide member 202 of the pressure regulating valve is extended by a rod 207 which is guided in a member 208 attached to the body, this rod carrying an abutment washer 209 against which a weak balancing spring 210 bears and terminating in a cup 211 against which a substantially stiffer spring 212 bears, the other end of the spring 212 bearing against a hollow piston 213. This piston is subjected on its right face to the pressure prevailing in a chamber 214 connected to the pipe 106 and to the pipe 104 which is closed or connected to the tank depending on the position of the slide member of the accumulator MAF2 of the brake F2 when the brake F2 is supplied with actuating fluid or not supplied with fluid.

The main relay valve VR1 comprises a body 240 in which is slidably mounted a slide member 241, controlling the communication between an inlet pipe 116 leading from the gear ratio changing valve VPa and in which prevails the line pressure, and an outlet pipe 119 connected to the brake F2 through the sub-assembly MRF2. This slide member is subjected on its left face 242 to the pressure prevailing in the pipe 121, 124 supplying fluid to the clutch E2 and extended at its right end first by an enlarged portion 243 defining a radial shoulder 244 which defines with the body a chamber 245 into which opens the pipe 160 connected to the inlet pipe 116 in which the line pressure prevails. The slide member is extended also by a stem 246 of reduced diameter which is guided in a fixed member 247 attached to the body 240, this member defining a chamber 248 which is interposed in the supply pipe 117 of the clutch E2, this chamber having such shape that the end 249 of the stem 246 communicates therewith. A balancing spring 250 is interposed between the face 251 of the slide member and the fixed member 247 and an intermediate chamber 252 in which the spring is located is connected by way of a pipe 161 to the pipe 104 which extends between the chamber 214 of the pressure regulating valve and the sub-assembly MAF2.

As can be seen in FIG. 3, in third speed, in which the two chambers 206 and 214 of the pressure regulating valve are connected to the exhaust, the slide member 241 of the main relay valve is subjected to the force of pressure exerted on its left face 242 and to the forces of pressure exerted on the radial shoulder 244 and on the end 249 of the stem 246. The chamber 252 is connected to the exhaust in the modulator MAF2. The areas of the end face of the stem and the radial shoulder are so chosen as to be equal, so that the resultant of the forces of the pressure exerted on these two areas is nil and the slide member is maintained in the position on the right as viewed in the drawing, that is, the position in which the supply of fluid to the brake F2 is cut off.

When the gear ratio changing valve VPa is brought by the closure of valve e2 to the position shown in FIG. 4 which corresponds to the transitory stage preceding the engagement of the second speed, its slide member cuts off the supply of fluid to the clutch E2 and puts it in communication with the tank so that the pressures which were exerted on the left end face 242 and on the right end face 249 of the slide member of the main relay valve VR1 are suppressed and this slide member is no longer subjected to the force due to the line pressure exerted on the radial shoulder 244 and the force of pressure which is exerted in the intermediate chamber 252 on the face 251, since, as explained hereinbefore, in the course of changing from third speed to second speed under torque the sub-assemblies MAE2 and MAF2 are immediately put back in the position in which the two pipes 104 and 105 are closed, which reestablishes the pilot pressure in the chambers 204 and 214 of the pressure regulating valve. Consequently, there are exerted on the slide member of the main relay valve two opposed forces of pressure due respectively to the line pressure and the pilot pressure, the sections on which these pressures are exerted being chosen in a suitable manner. It will be understood then that the duration of the displacement to the left of the slide member of the main relay valve is a function of the value of these two forces of pressure which are, as in the first embodiment described, representative of two parameters of operation of the engine, namely the speed in respect of the line pressure and the load or the torque in respect of the pilot pressure. Thus, it is again clear that the desired result is achieved and that the brake F2 corresponding to the engagement of the second speed is actuated only after a variable period of time which depends on the instantaneous conditions of operation of the engine.

By way of example, it may be mentioned that this duration of the transitory period may vary in a ratio of 1:4, it being possible to reduce or increase this range as required.

Note also that in the embodiment shown in FIGS. 3 and 4, the slide member of the sub-assemblies MRE2 and MRF2, the pilot valve VPi and the secondary relay valve VR2 are identical, which decreases the number of different parts required and the manufacturing cost and facilitates manufacture.

The invention has been described in its application to a gearbox having three forward speeds, or gear ratios. However, it must be understood that it can also be employed advantageously in a gearbox having two or four speeds.

Having now described my invention what I claim as new and desire to secure by Letters Patent is:

1. In a hydraulic control system for actuating a plurality of fluid pressure actuated devices for engaging different gear ratios of gearbox of an engine, comprising a tank containing control fluid, a pump drawing fluid from the tank and having an outlet, a control fluid line connected to the pump outlet, a pressure regulating valve connected to the line for regulating the value of the line fluid pressure, the line forming part of a circuit comprising: a change gear valve for connection to means for automatically operating the change gear valve, the change gear valve having a plurality of operative positions and being capable, depending on its operative position, of putting said line pressure in communication with a selected one of two of said devices, a first of said two devices being for engaging, upon actuation by said line pressure, a given ratio of the gearbox and a second of said two devices being for engaging, upon actuation by said line pressure, a ratio of the gearbox corresponding to the next higher ratio relative to said given ratio; a main relay valve interposed between the change gear valve and said first device, said relay valve comprising a slide member which is axially movable between a first position and a second position and has opposed faces, means for subjecting one of said faces to line pressure actuating said second device, when the change gear valve puts said line pressure in communication with said second device, and urging the slide member to said second position, means co-operative with the slide member for putting said line pressure in communication with and actuating said first device in said first position of the slide member and for interrupting communication of said line pressure with said first device in said second position of the slide member, and means for returning the slide member to said first position when said second device is not actuated and said line pressure is not exerted on said one face of the slide member; the provision in said hydraulic system of fluid pressure means for applying to the slide member of the main relay valve an axial modulating force which is a function of the torque of the engine and the running speed of the engine, whereby, when changing under torque from said higher ratio to said given ratio, the time for displacing the slide member from said second position to said first position when the change gear valve stops the communication of the second device with said line pressure is adapted to the instantaneous torque of the engine and the instantaneous running speed of the engine.

2. In a hydraulic control system for actuating a plurality of fluid pressure actuated devices for engaging different gear ratios of a gearbox of an engine, comprising a tank containing control fluid, a pump drawing fluid from the tank and having an outlet, a control fluid line connected to the pump outlet, a pressure regulating valve connected to the line for regulating the value of the line fluid pressure, the line forming part of a circuit comprising: a change gear valve for connection to means for automatically operating the change gear valve, the change gear valve having a plurality of operative positions and being capable, depending on its operative position, of putting said line pressure in communication with a selected one of two of said devices, a first of said two devices being for engaging, upon actuation by said line pressure, a given ratio of the gearbox and a second of said two devices being for engaging, upon actuation by said line pressure, a ratio of the gearbox corresponding to the next higher ratio relative to said given ratio; a main relay valve interposed between the change gear valve and said first device, said relay valve comprising a slide member which is axially movable between a first position and a second position and has opposed faces, means for subjecting one of said faces to line pressure actuating said second device, when the change gear valve puts said line pressure in communication with said second device, and urging the slide member to said second position, means co-operative with the slide member for putting said line pressure in communication with and actuating said first device in said first position of the slide member and for interrupting communication of said line pressure with said first device in said second position of the slide member, and means for returning the slide member to said first position when said second device is not actuated and said line pressure is not exerted on said one face of the slide member; the provision in said hydraulic system of means supplying a fluid having a first pressure proportional to the running speed of the engine, means supplying a fluid having a second pressure proportional to the torque of the engine, a modulating valve connected to said line so as to be supplied with fluid at said line pressure and furnishing a modulated pressure from said line pressure, means for applying the modulated pressure to the slide member of the main relay valve so as to produce an axial modulating force on the slide member, the modulating valve comprising a slide member and means for subjecting the slide member of the modulating valve to two opposed pressures corresponding to said first pressure and said second pressure, whereby, when changing under torque from said higher ratio to said given ratio, the time for displacing the slide member of the relay valve from said second position to said first position when the change gear valve stops the communication of the second device with said line pressure is adapted to the instantaneous torque of the engine and the instantaneous running speed of the engine.

3. In a hydraulic control system for actuating a plurality of fluid pressure actuated devices for engaging different gear ratios of a gearbox of an engine, comprising a tank containing control fluid, a pump drawing fluid from the tank and having an outlet, a control fluid line connected to the pump outlet, a pressure regulating valve connected to the line for regulating the value of the line fluid pressure, the line forming part of a circuit comprising: a change gear valve for connection to means for automatically operating the change gear valve, the change gear valve having a plurality of operative positions and being capable, depending on its operative position, of putting said line pressure in communication with a selected one of two of said devices, a first of said two devices being for engaging, upon actuation by said line pressure, a given ratio of the gearbox and a second of said two devices being for engaging, upon actuation by said line pressure, a ratio of the gearbox corresponding to the next higher ratio relative to said given ratio; a main relay valve interposed between the change gear valve and said first device, said relay valve comprising a slide member which is axially movable between a first position and a second position and has opposed faces, means for subjecting one of said faces to line pressure actuating said second device, when the change gear valve puts said line pressure in communication with said second device, and urging the slide member to said second position, means co-operative with the slide member for putting said line pressure in communication with and actuating said first device in said first position of the slide member and for interrupting communication of said line pressure with said first device in said second position of the slide member, and means for returning the slide member to said first position when said second device is not actuated and said line pressure is not exerted on said one face of the slide member; the provision in said hydraulic system of means supplying a fluid having a first pressure proportional to the running speed of the engine, means supplying a fluid having a second pressure proportional to the torque of the engine, means for subjecting the slide member, in the course of changing under torque from said higher ratio to said given ratio, to two opposed forces which correspond to respectively said first pressure and said second pressure, means being provided for suppressing the effect of said first pressure and second pressure in respect of conditions of operation of the system other than the conditions of changing under torque.

4. A control system as claimed in claim 3, wherein the pressure regulating valve comprises a first chamber and means for selectively putting the chamber under pressure and connecting the first chamber to the tank according to the ratio engaged in the gearbox, the slide member of the main relay valve partly defines a second chamber and means are provided for connecting the first chamber to the second chamber.

5. A control system as claimed in claim 3, wherein the slide member of the main relay valve comprises a first radial face subjected to the action of said first pressure and a second radial face which faces in the opposite direction to the first radial face and has an area equal to the area of the first face and subjected to the action of said first pressure in respect of conditions of operation of the system other than the conditions of changing under torque from said higher ratio to said given ratio.

6. A control system as claimed in claim 3, wherein the pressure proportional to the running speed is the line pressure.

7. A control system as claimed in claim 6, wherein the pressure regulating valve comprises a chamber, means for selectively putting the chamber under pressure and connecting the chamber to the tank, depending on the ratio engaged in the gearbox, a piston slidably mounted in the chamber, a relatively stiff spring interposed between the slide member of the pressure regulating valve and the piston so as to introduce a static condition of regulation, when the chamber is under pressure, and vary the line pressure as a function of the running speed of the engine.

8. A control system as claimed in claim 3, comprising a pilot valve associated with the engine to supply a pilot fluid pressure which varies with the torque of the engine and corresponds to said pressure proportional to the torque.

9. A control system as claimed in claim 2, wherein the pressure proportional to the running speed is the line pressure.

10. A control system as claimed in claim 9, wherein the pressure regulating valve comprises a chamber, means for selectively putting the chamber under pressure and connecting the chamber to the tank, depending on the ratio engaged in the gearbox, a piston slidably mounted in the chamber, a relatively stiff spring interposed between the slide member of the pressure regulating valve and the piston so as to introduce a static condition of regulation, when the chamber is under pressure, and vary the line pressure as a function of the running speed of the engine.

11. A control system as claimed in claim 2 comprising a pilot valve assocated with the engine to supply a pilot fluid pressure which varies with the torque of the engine and corresponds to said pressure proportional to the torque.

* * * * *